Figure 1:
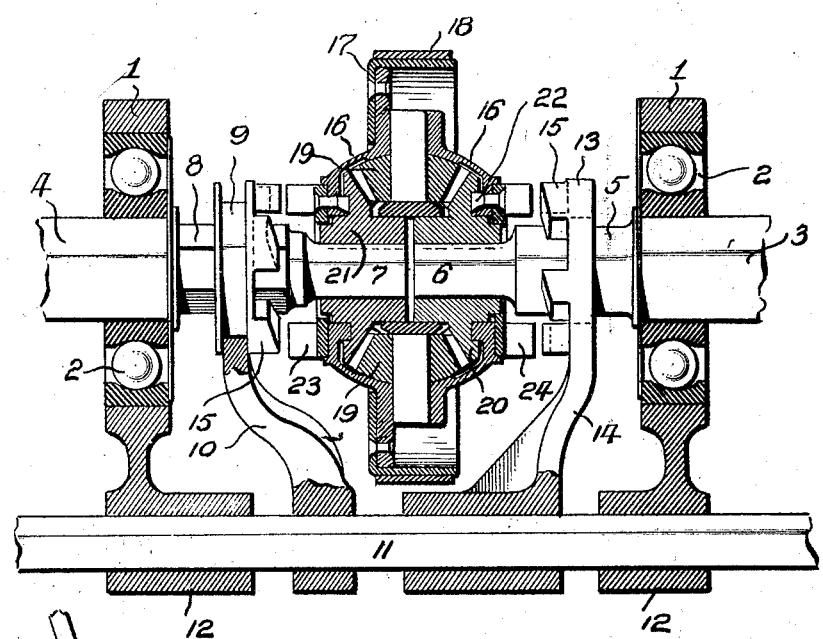

Aug. 18, 1925.

E. SPRUNG ET AL 1,550,119

POWER TRANSMISSION MECHANISM

Filed Aug. 30, 1920

Inventor
Edmund Sprung,
Harper Pulleyblank,
BY
ATTORNEYS

Patented Aug. 18, 1925.

1,550,119

UNITED STATES PATENT OFFICE.

EDMUND SPRUNG AND HARPER PULLEYBLANK, OF DETROIT, MICHIGAN.

POWER-TRANSMISSION MECHANISM.

Application filed August 30, 1920. Serial No. 406,860.

*To all whom it may concern:*

Be it known that we, EDMUND SPRUNG and HARPER PULLEYBLANK, citizens of the United States of America, residing at Detroit, in the county of Wayne and State of Michigan, have invented certain new and useful Improvements in Power-Transmission Mechanism, of which the following is a specification, reference being had therein to the accompanying drawings.

This invention relates to a power transmission mechanism especially designed for motor and other power boats and the mechanism may be conveniently located between the power plant of the boat and the propeller of the boat and controlled from any suitable point within the boat.

The primary object of our invention is to utilize a novel differential mechanism by which direct and reverse power may be transmitted from an engine driven shaft to a propeller shaft, and the reverse speed may be attained either by a clutch or a brake associated with the differential mechanism.

A further object of our invention is to provide power transmission mechanism for boats wherein the parts are constructed with a view of reducing the cost of manufacture and at the same time retain those features by which safety, durability and ease of assembling are secured.

With such ends in view, our invention resides in the construction to be hereinafter described and then claimed.

Reference will now be had to the drawing wherein

Figure 2:
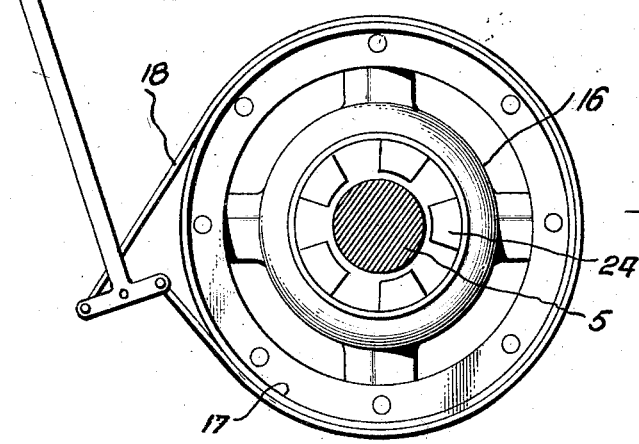

Figure 1 is a horizontal sectional view of the power transmission mechanism, and Fig. 2 is a cross sectional view of a portion of the same.

In the drawing the reference numeral 1 denotes brackets provided with anti-frictional bearings 2 for longitudinally aligning drive and driven shafts 4 and 3 respectively and the shaft 4 may be considered as a power or engine driven shaft, while the shaft 3 may be considered as a propeller shaft, but in so designating these shafts we do not care to confine our invention to such use.

The power shaft 4 has a cylindrical guide portion 5 and a reduced end 6 which confronts the reduced end 7 of the propeller shaft 3, said shaft having a square, hexagon or otherwise shaped guide portion 8 for establishing a driving relation with a clutch member 9. This clutch member is free to revolve with the propeller shaft 3 and may be shifted longitudinally of the guide portion 8 by a fork or a yoke 10 loosely engaging the clutch member and fixed on a shift rod 11 slidable in bearings 12 carried by the brackets 1.

Slidable on the cylindrical guide portion 5 of the power shaft 4 is a clutch member 13 having an integral arm 14 fixed relative to the shift rod 11, so that the clutch members 9 and 13 may be moved in unison. Both of these clutch members have beveled teeth 15 adapted to alternately engage a differential mechanism which is supported on the reduced ends 6 and 7 of the shafts 3 and 4 respectively.

The differential mechanism may be of any well known type and in its preferred form comprises a two part somewhat spherical casing 16 having its periphery provided with a brake shoe 17 adapted to be engaged by a conventional form of brake band 18 which permits of the differential casing 16 being held stationary. In the differential casing are intermediate rotatable beveled gear wheels 19 meshing with beveled gear wheels 20 and 21 keyed or otherwise fixed on the reduced ends 6 and 7 of the power and propeller shafts.

Suitably connected to the end faces of the casing 16, by rivets 22 or other fastening means are clutch members 23 and 24 confronting the clutch members 9 and 13 respectively and the clutch members 23 and 24 have teeth corresponding to the teeth 15.

As shown in Fig. 1 the power transmission mechanism is in a neutral position with the power shaft 3 idle relative to the propeller shaft 4. When the clutch member 9 is shifted into engagement with the clutch member 23 the clutch member 23, the casing 16, the gear wheel 21 and the gear wheels 19 are locked relative to the power shaft and by reason of the gear wheel 21 being fixed on the reduced end 6 of a power shaft 4, said shaft may impart a direct drive to the propeller shaft 3.

To obtain a reverse drive, either the brake band 18 or the clutch 13 may be used to hold the differential casing 16, in which case power is transmitted from the shaft 4 through the gear wheel 21, intermediate gear wheels 19 to the gear wheel 20 of the propeller shaft 3, the intermediate gear wheels 19 causing a reverse rotation of the propeller shaft 3 relative to the power shaft 4.

We do not care to confine our invention to the specific construction of the interlocking clutch members, to the specific construction of the brake band, nor to such other changes as fall within the scope of the appended claim.

What we claim is:—

In a power transmission mechanism wherein drive and driven shafts are articulated and adapted for either forward or reverse drive:—alining drive and driven shafts, a differential mechanism articulating said shafts, said differential mechanism including a cylindrical rotatable casing, toothed clutch members carried by said casing, a toothed clutch member slidable on said drive shaft and adapted to be placed in engagement with one of the clutch members of said casing to hold said casing and cause said differential mechanism to establish a reverse drive of said driven shaft by said drive shaft, a toothed clutch member slidably mounted on said driven shaft for rotation therewith and adapted to be shifted into engagement with the other clutch member of said casing to establish a direct drive between said shafts, means connecting said slidable clutch members and adapted for moving said clutch members relative to said differential mechanism, a cylindrical brake shoe surrounding said differential casing and having an inturned flange connected to said casing, and a brake band about said shoe adapted to retard the transmission of power during forward direct drive when said differential mechanism rotates as a unit.

In testimony whereof we affix our signatures.

EDMUND SPRUNG.
HARPER PULLEYBLANK.